United States Patent [19]

Waller

[11] 3,740,007
[45] June 19, 1973

[54] COMBAT RESCUE POD
[75] Inventor: Alexander E. Waller, San Diego, Calif.
[73] Assignee: The United States of America as represented by the Secretary of the Navy, Washington, D.C.
[22] Filed: Apr. 29, 1971
[21] Appl. No.: 138,412

[52] U.S. Cl. .................................. 244/137 P, 9/14
[51] Int. Cl. ...................... B64d 25/02, A62b 1/16
[58] Field of Search .......... 244/135, 137 R, 137 P, 244/138 R, 140; 9/14; 89/1.5

[56] References Cited
UNITED STATES PATENTS
2,967,684  1/1961  Knecht ............................. 244/136
3,444,596  5/1969  Greenberg et al. ...................... 9/14
3,467,346  9/1969  Carson, Jr. .......................... 244/137
3,476,339  11/1969  Pugh ............................. 244/137 R Primary Examiner—Milton Buchler
Assistant Examiner—Jesus D. Sotelo
Attorney—R. S. Sciascia and Thomas O. Watson, Jr.

[57] ABSTRACT

A rescue pod for retrieving downed pilots from hostile environments. A pod is suspended from an aircraft with fuel occupying its internal space. The fuel is used during flight to the downed crewmen or transferred to an internal tank before rescue. Upon reaching the rescue area, a hoisting line is lowered from the pod to the man awaiting rescue who is then taken into the internal pod chamber. The pod is then closed and raised to a horizontal position. The crewman is protected from air loads, hot jet efflux and small arms fired by the pod.

10 Claims, 6 Drawing Figures

INVENTOR.
ALEXANDER E. WALLER
BY Thomas O. Watson Jr.

ATTORNEY

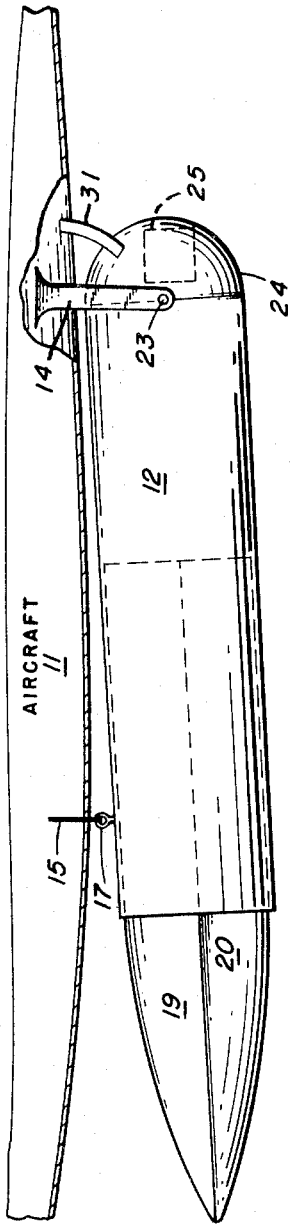
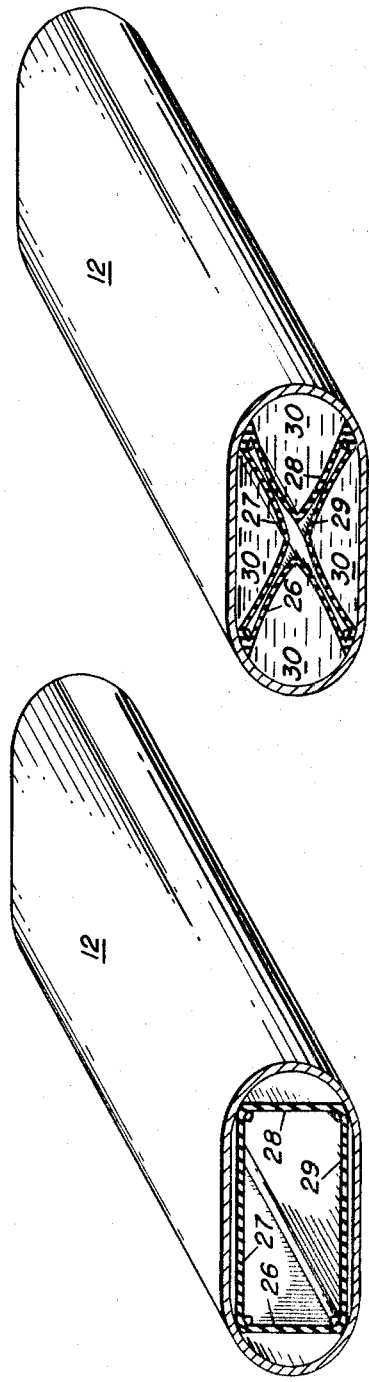

COMBAT RESCUE POD

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The current rescue practice is to use helicopters for the combat rescue of aircraft crewmen who are shot down over enemy held territory. Increasing enemy defenses have almost eliminated the use of helicopters for this purpose as many of the helicopter crewmen as well as the rescued crewman have been killed or wounded in the pick-up attempts.

SUMMARY OF THE INVENTION

One solution to the problem of helicopter vulnerability is to substitute a high speed rescue aircraft with a hover capability. The most survivable of this type of aircraft is a vertical take off and landing aircraft (VTOL) with jet engines. An evaluation of the design requirements of such aircraft indicates that external carriage of the rescued crewmen is the most desirable. Within this design constraint, two configurations are possible. The first is where the entire rescue assembly is lowered to the ground and the alternative being where a hoisting line is used to recover the crewmen. In the latter, the rescue pod is retained on the aircraft. This is the approach of the present invention.

The pod is carried beneath the rescue aircraft with fuel occupying its internal space. During the flight to the downed crewmen, the fuel in the pod is either consumed or transferred to an internal fuel tank. On arrival in the vicinity of the downed crewmen, the pod is lowered to a vertical position and opened. A hoisting line is lowered to the man awaiting rescue who then attaches it to his regular parachute harness fittings. The downed crewmen is then hoisted into the pod and the pod is closed and returned to the horizontal or flight position.

Once in the pod, the downed crewman can attach an awaiting parachute, hook up to the aircraft inter-comm and be transported to the rescue airfield or ship. During flight and during recovery, the man is protected from airloads, hot jet efflux from the engines and small arms fire. On arrival at the rescue base of the aircraft, the man may be recovered after landing of the aircraft or the pod operation may be reversed and the man lowered to the ground.

OBJECTS OF THE INVENTION

An object of the present invention is the provision of a system for the rescue of downed crewmen.

Another object is to provide a rescue system which may be used with VTOL type aircraft.

A further object of the invention is the provision of an externally mounted retrieval device.

Still another object is to provide a device which protects downed crewmen from small arms fire.

A still further object is the provision of a rescue pod which also acts as an auxillary fuel tank prior to rescue.

Other objects, advantages, and novel features of the present invention will become apparent from the following detailed description of the invention when considered in conjunction with the accompanying drawings.

BRIEF DESCRIPTIONS OF THE DRAWINGS

FIG. 4 shows a more detailed view of the rescued pod of the present invention in the orientation shown in FIG. 1.

FIG. 5 shows an internal view of a portion of the rescue pod body of the present invention.

FIG. 6 shows the same view as shown in FIG. 5 with fuel stored within the rescue pod.

DESCRIPTION OF THE PREFERRED EMBODIMENT

Figure 1:
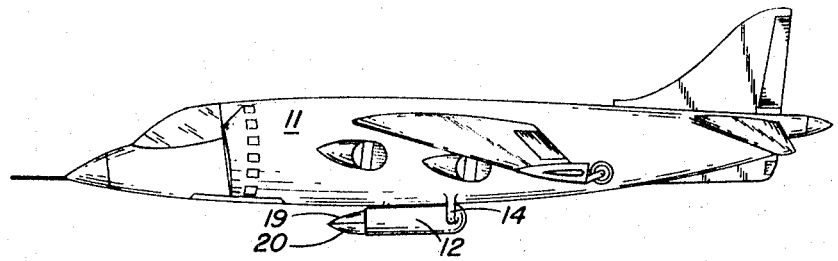
FIG. 1 shows the rescue pod of the present invention in the in-flight position.

FIG. 1, which illustrates a preferred embodiment of the rescue pod of the present invention, shows a VTOL aircraft 11 with a rescue pod body 12 and closing portions 19 and 20 suspended from its underside. The pod body 12 is shown in a horizontal position which is its orientation during flight to and from the rescue site.

Figure 2:
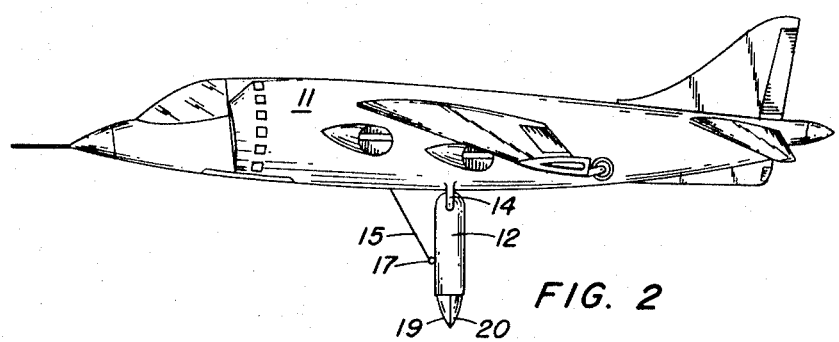
FIG. 2 shows the rescue pod of the present invention in the lowered or vertical position.

Upon reaching the vicinity of the downed crewman, the rescue pod is lowered to the vertical position shown in FIG. 2. As can be seen in FIG. 2, the pod body 12 is pivotally connected to the aircraft 11 by means of an extending portion 14. Any suitable means for pivotally connecting the pod body 12 to the aircraft 11 is acceptable for this application.

The angular position of the pod body 12 relative to the aircraft 11 is controlled through a lanyard 15 connected at one end to the pod body 12 by an eye 17 and controlled at the other end by any suitable winch type device. It can be seen, that the raising and lowering of the pod 12 is simply a matter of winding or unwinding the lanyard 15 within the aircraft 11.

Figure 3:
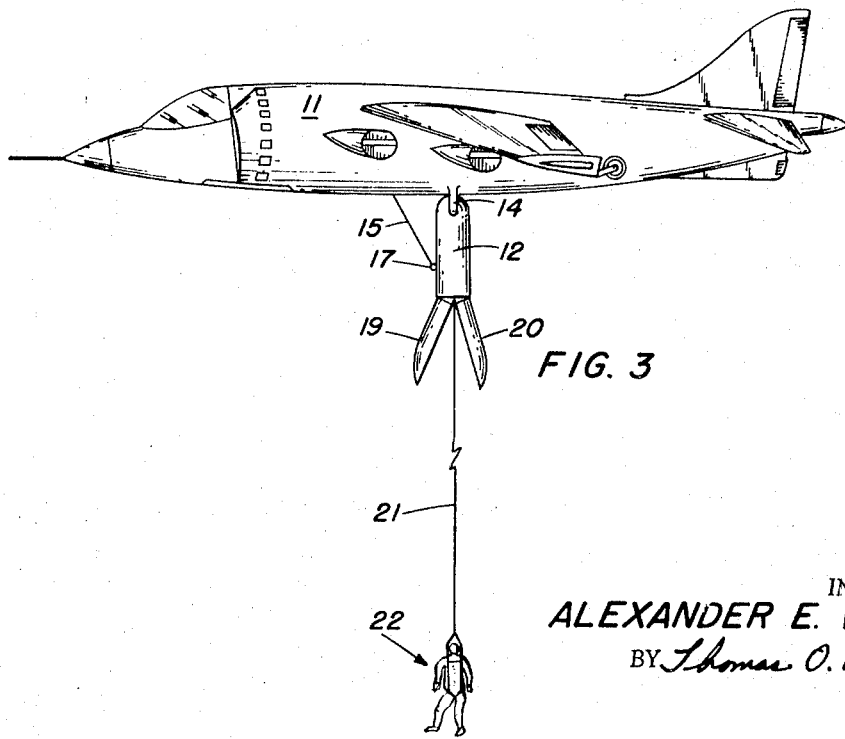
FIG. 3 shows the rescue pod of the present invention in its opened configuration ready to accept the downed crewman.

Referring now to FIG. 3, there is shown a view of the rescue pod with its closing portions 19 and 20 in their extended position. By comparison with FIGS. 1 and 2, it can be seen that during flight the portions 19 and 20 are located partially within the body 12 of the rescue pod. After the pod has been lowered to the vertical position shown in FIG. 2, the extending portions 19 and 20 slide down within the body 12 of the pod and are opened by spring action. Portions 19 and 20 may be slidably mounted on hinges as shown, for example by Barnes et al. in U.S. Pat. No. 1,866,874. This sliding may be accomplished either by gravity or may be facilitated through the use of external systems. These external systems may be hydraulic, electric or mechanical so long as they provide the necessary sliding of the portions 19 and 20 within the body 12 of the rescue pod. The spring action which causes the portions 19 and 20 to open is simply one which causes them to separate as they slide from the rescue pod body 12 (i.e. as the constraint against their separation, caused by the rescue pod body 12, is removed). If the closing portions 19 and 20 are mounted on hinges, the hinges may be spring biased as shown, for example, by Rogers in U.S. Pat. No. 822,555.

When the portions 19 and 20 have been opened, a hoisting line 21 is lowered to the crewman 22 awaiting rescue. The hoisting line is provided with fittings which attach to the regular parachute harness fittings. With the man 22 connected to the hoisting line 21, he is raised by the line 21 into the body 12 of the rescue pod, the portions 19 and 20 are withdrawn and the pod is swung into the horizontal position shown in FIG. 1. This position is the flight position.

During flight, the man is protected from airloads, hot jet efflux from the engines and small arms fire by the pod. On arrival at the rescue base of the aircraft, the man may be recovered after the aircraft has landed or the pod operation may be reversed and the man lowered to the ground by the hoisting line 21.

Any VTOL type aircraft with adequate hover and lift capability can be configured as a rescue vehicle in a relatively short time through the use of the present invention. This obviates the requirement for specialized rescue vehicles. In addition, rescue can be effected in minimum time and with a minimum effort on the part of the downed crewman waiting on the ground. Also, once the downed crewman is in the pod, he can attach an awaiting parachute and hook up to the aircraft intercomm. If the pod is intended to be permanently carried by the rescue vehicle, it may also incorporate additional features such as cabin pressurization and air conditioning.

The details of the rescue pod 12 are shown more clearly in the illustration of FIG. 4. Here again, the rescue pod body 12 is shown in the horizontal or flight position with the extending opening portions 19 and 20 in their withdrawn positions. The pod body 12 is held in a horizontal position through a lanyard 15 acting on an eye 17. At the aft end of the pod, a hinge extending portion 14 — which is rigidly attached to the aircraft 11 — is pivotally connected to the pod by a pin 23 which passes through the pod assembly at the junction of the pod body 12 and the rear portion of the pod assembly 24. Rear portion 24 normally houses hoist line 21 and a suitable winch 25 which may be activated to raise or lower line 21. Moreover, a parachute, communication devices, and other equipment may be stored in the rear portion 24.

Referring now to FIGS. 5 and 6, there is shown an internal view of a portion of the pod body 12 with internal membranes 26 — 29. In the configuration of FIG. 5, the space between the membranes 26 – 29 is provided for the rescued crewman. During flight to the rescue area, fuel is stored within the pod body 12 between the body 12 and the membranes 26 – 29. The fuel storing configuration is shown in FIG. 6 with the fuel designated by reference numeral 30. The membranes 26 – 29 provide a protection for the crewman from the fuel fumes by acting to convert the space within the pod body 12 into essentially two different compartments. Any fuel left within the pod body 12 when the aircraft reaches the vicinity of rescue, can be transferred to an internal tank by means of line 31 which is connected to appropriate pumping apparatus which may be located in the aircraft.

The concept of the rescue pod of the present invention may be extended to rescue two or more men. If this were done, it could resemble a multi-barreled gun with one man "stored" in each "barrel". Also, the hinge extending portion 14 can be located at a position near the center gravity of the rescue aircraft. By doing this, the trim and thrust requirements of the aircraft are reduced. Obviously many other modifications and variations of the present invention are possible in light of the above teachings. It is therefor to be understood that, within the scope of the appended claims, the invention may be practiced otherwise than specifically described.

What is claimed is:

1. A rescue system for retrieving downed crewman which comprises:
    an aircraft having a hover capability;
    a hollow body pivotally suspended beneath the aircraft;
    two members slidably positioned within the hollow body, said members combining to close one end of the hollow body when in one position and separating to open the end of the hollow body when in a second position;
    means for pivoting the hollow body relative to the aircraft; and
    a hoisting line which is lowered from the hollow body when the slidable members are in the second position.

2. The system of claim 1 wherein the aircraft is a VTOL type aircraft.

3. The system of claim 1 further including means within the hollow body for storing fuel such that a crewman within the hollow body is not exposed to the fuel fumes.

4. The system of claim 3 wherein the fuel storing means comprises a plurality of membranes.

5. A rescue pod for aircraft retrieval of downed crewman which comprises:
    a hollow body adapted to be pivotally connected to the aircraft;
    two members slidably positioned within the hollow body, said members combining to close one end of the hollow body when in one position and separating to open the end of the hollow body when in a second position; and
    a hoisting line which is lowered from the hollow body when the slidable members are in the second position.

6. The rescue pod of claim 5 further including means within the hollow body for storing fuel such that a crewman within the hollow body is not exposed to the fuel fumes.

7. The rescue pod of claim 6 wherein the fuel storing means comprises a plurality of membranes.

8. A rescue system for retrieving downed crewman which comprises:
    an aircraft having a hover capability;
    a hollow body pivotally suspended beneath the aircraft;
    means for pivoting the hollow body relative to the aircraft;
    a hoisting line mounted within said hollow body and lowerable therefrom; and
    at least one membrane mounted within said hollow body for storing fuel such that a crewman within the hollow body is not exposed to the fuel fumes.

9. The rescue system of claim 8 further comprising closure means connected to said hollow body for closing one end of said hollow body when in one position and opening the end of the hollow body when in a second position.

10. The rescue system of claim 9 wherein said closure means comprises two members slidably positioned within the hollow body.

* * * * *